United States Patent Office 3,532,500
Patented Oct. 6, 1970

3,532,500
LIGHT SENSITIVE VESICULAR COMPOSITION COMPRISING AN AZIDO-s-TRIAZINE COMPOUND
William J. Priest and Akemi S. Marshall, Rochester, N.Y., assignors to Eastman Kodak Company, Rochester, N.Y., a corporation of New Jersey
No Drawing. Filed July 25, 1967, Ser. No. 655,740
Int. Cl. G03c 1/52, 1/72
U.S. Cl. 96—91                                   7 Claims

ABSTRACT OF THE DISCLOSURE s-Triazines substituted on a nuclear carbon atom with at least one azido group and at least one substituent having a conjugated structure, the pi electron system of which is strongly coupled with that of the triazine nucleus, and which absorbs light in the 300 to 400 m$\mu$ range, such as an aromatic substituent, are useful as gas-forming or photoblowing agents in vesicular compositions. These triazines are produced from cyanuric chloride and cyanuric bromide by reaction with a compound which provides the desired non-azido substituent to produce a substituted mono- or dichloro-s-triazine or a mono- or dibromo-s-triazine, followed by reaction with sodium azide to replace chlorine or bromine by the azido group. The azido-s-triazines so prepared are advantageously used in vesicular compositions. The specification and claims designate the scope of the present invention.

---

This invention relates to photography and to light-sensitive triazines which have particular utility as photoblowing agents for vesicular compositions.

As is well-known vesicular compositions comprise a photoblowing or gas-forming agent uniformly dispersed in a thermoplastic matrix. The photoblowing agent is a compound which, on exposure to radiation, especially short wave radiation such as ultraviolet or near ultraviolet light, decomposes with the associated formation of gas.

The most common photosensitive gas-forming compounds are those having a diazo-linkage (—N=N+) or an azido group (—N₃), which release nitrogen on decomposition. Most, however, cannot be used as photoblowing agents in conventional photoimaging processes because they are not sensitive to light in the near ultraviolet or visible spectral ranges. Of those compounds which are sensitive in these ranges, many are unsuitable because of poor stability and/or the formation of highly colored residues. For example, o-substituted aroyl azides and β-carbonyl azides such as quinone azides can be thermally unstable as well as suffering decreased photoactivity on storage and 4-nitronaphthyl azide, a thermally stable compound, forms a highly colored residue on fixation.

Accordingly, it is an object of this invention to provide new light-sensitive photoblowing agents which exhibit advantageous thermal stability.

Another object of this invention is to provide novel, light-sensitive photoblowing agents which do not exhibit significantly decreased photoactivity upon storage.

Still another object of the present invention is to provide new, light-sensitive photoblowing agents which do not form colored residues on fixation.

Yet another object of this invention is to provide novel, organic solvent soluble, essentially non-volatile, substantially hydrophobic light-sensitive photoblowing agents which exhibit increased utility in vesicular compositions.

Yet an additional object of the instant invention is to provide novel vesicular compositions and photographic elements comprising a support having coated thereon such vesicular compositions.

These and other objects of the present invention will become additionally apparent from a consideration of the following description and appended claims.

The objects of this invention are accomplished with light-sensitive azido-s-triazines capable of releasing nitrogen on exposure to actinic radiation, which absorbs light in the 300 to 400 m$\mu$ range and which are characterized further as being substiuted on at least one nuclear carbon with an azido group and on at least one nuclear carbon with an activating substituent which contains a conjugated double bond system whose pi electron system is strongly coupled with the pi electron system of the s-triazine nucleus. Such azido-s-triazines can be represented by the formula:

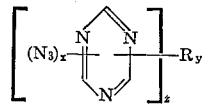

wherein each of $x$ and $y$ is an integer having a value of 1 or 2 and where the sum of $x$ and $y$ is 3; $z$ is an integer having a value of at least 1, preferably from 1 to 2; and R is an organic activating substituent which contains a conjugated double bond system whose pi electron system is strongly coupled with the pi electron system of the s-triazine nucleus and which promotes absorption of light in the 300 to 400 m$\mu$ range. Advantageously employed activating substituents (R) include conjugated aliphatic compositions such as butadienyl, hexatrienyl and the like. Conjugated aromatic radicals such as phenyl, naphthyl and the like aryl radicals which are unsubstituted or substituted with one or more substituents, such as lower alkyl, lower alkoxy, halogen, hydroxy, mercapto and the like, are also activating substituents. With such aromatic radicals, halogen, hydroxy and mercapto are preferred substituents. Still other suitable conjugated aromatic radicals for the R substituent include heterocyclic groups, for example, nitrogen-containing radicals typically having 5 to 6 members in the hetero ring such as pyridyl, quinolyl and the like. In general, the activating R substituent must possess a conjugated double bond system, the pi electron system of which is strongly coupled with that of the triazine nucleus. In addition, this R substituent should be one which promotes absorption of light in the 300 to 400 m$\mu$ range.

A particularly preferred class of azido-s-triazine has the formula:

(II)

wherein R is as defined above, and each of $m$ and $n$ is an integer having a value of from 1 to 2, and the sum of $m$ and $n$ is 3, with the diazido-s-triazines being most preferred.

Illustrative examples of these compounds include diphenylazido - triazine, 2,4 - diazido - 6 - (2 - hydroxynaphthyl)-s-triazine, 2,4-diazido-6-(4 - hydroxynaphthyl)-s-triazine, dibutadienylazido - s - triazine, 2,4-diazido-6-hexatrienyl-s-triazine, 2,4-diazido-6-pyridyl - s - triazine, 2,4 - diazido - 6 - quinolyl-s-triazine, 2,4-diazido-6-anthracenyl-s-triazine, dinaphthylazido-striazine, bis(diazido-s-triazinyl) benzene, bis(diazido-s-triazinyl)naphthalene, ditolyl - azido-s-triazine, bis(hydroxy-phenyl)azido-s-triazine, bis(mercaptophenyl) azido-s-triazine and the like.

The mono- and diazido-s-triazine compounds of this invention are readily obtained by generally known reactions which give a product wherein conjugation of the triazine heterocycle with the substituent is possible. More particularly, such reactions comprise reacting cyanuric chloride or cyanuric bromide with an aliphatic or aromatic compound to produce an open chain or aryl-substituted chloro- or bromo-s-triazine, followed by reaction with sodium azide.

The compounds which are reacted with cyanuric chloride or cyanuric bromide are such conjugated compounds as will replace the halogen of the cyanuric chloride or bromide. They include aliphatic and aromatic Grignard reagents of the general formula RMgX; aryl halides of the general formula RX, wherein R is as defined above and X is halogen; and substituted aromatic compounds having an active hydrogen; i.e., a hydrogen which has been activated by the presence of an electron-donating substituent, such as hydroxyl or mercapto in a position ortho- or para- with respect to the active hydrogen.

The resulting product is a chloro-s-triazine or bromo-s-triazine having the general formula:

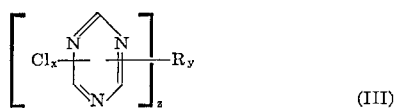

(III)

wherein R, $x$, $y$ and $z$ are as defined above. This compound is reacted with sodium azide in an amount sufficient to replace the chlorine or bromine with azide groups. The reaction is normally effected in an inert organic solvent, for example, acetone, at about room temperature, although other conditions can be employed as desired.

The composition of the polymeric matrix of the vesicular compositions of this invention can be any of the conventional matrices used in preparing vesicular compositions. The requirements for the matrix are known to the art, and include thermoplasticity, hydrophobicity, sufficient impermeability to nitrogen gas to prevent undue loss of the gas before development of the image, and the like. Matrix compositions which are known to be suitable include polystyrene, poly(vinyl chloride), poly(vinylidene chloride), copolymers of vinyl chloride or vinylidene chloride with vinyl monomer such as acrylonitrile, acrylic acid, methyl acrylate, methyl methacrylate, diethyl maleate, vinyl acetate, vinyl alcohol and the like; copolymers of styrene with acrylonitrile, and the like. The matrix can be a single polymer or a mixture of two or more polymers.

The amount of azido-s-triazine which is present in the vesicular composition is not narrowly critical, provided there is at least an image-forming amount, i.e., an amount sufficient to provide an image after exposure and development. In general, the image-forming amount will be in the range of from about 2 to about 20 weight percent, and preferably from about 2 to 10 percent, based upon the total weight of the vesicular composition.

The vesicular composition can be employed as an unsupported film but is preferably coated upon a suitable support such as glass, cellulose acetate, cellulose nitrate, cellulose butyrate, polystyrene, poly(ethylene terephthalate), paper including polyethylene and polypropylene-coated paper and other known support materials.

The general technique of exposing and developing the vesicular compositions of this invention is known, and comprises exposing the composition to a source of radiation, preferably having a good intensity in the 300 to 400 m$\mu$ range, followed by heating to develop the image. To increase the speed of the composition, one can subject the composition to a preliminary exposure of uniform radiation to produce nuclei which provide an increase in specular optical density of from about 0.03 to about 0.5 density units, when developed, over the unexposed composition, followed by heating and then storing at 0 to 35° C. for at least 12 hours.

The following examples further illustrate the invention.

EXAMPLE 1

To a stirred mixture of 20.0 g. of cyanuric chloride, 15.7 g. of 2-naphthol and 150 ml. of benzene is added 14.6 g. of anhydrous aluminum chloride. The resulting mixture is stirred at 20° C. for 20 hours. The reaction mixture is poured into 250 milliliters of dilute hydrochloric acid, and the benzene is removed by steam distillation. The residue is filtered, washed with 100 milliliters of 1 percent hydrochloric acid in acetone and dried at 60° C. under reduced pressure. A 10-gram portion of the thus-produced 2,4 - dichloro-6-hydroxynaphthyl-s-triazine is suspended in 250 milliliters of acetone and 10 grams of sodium azide dissolved in 15 milliliters of water is added. After stirring at 20° C. overnight, the reaction mixture is filtered and the filter cake is washed with water and then crystallized from tetrahydrofuran to yield 2,4-diazido-6-(2-hydroxynaphthyl) - s - triazine as fluffy pale yellow needles melting at 217° C., with decomposition.

Analysis.—Calculated for $C_{13}H_7N_9O$ (percent): C, 51.2; H, 2.3; N, 41.3. Found (percent): C, 50.8; H, 2.1; N, 40.9. The product had absorption peaks at 338 m$\mu$ ($\epsilon$=4,400) and 382 m$\mu$ ($\epsilon$=6,300) in chloroform.

EXAMPLE 2

Employing procedures similar to those described in Example 1, except that 1-naphthol is substituted for 2-naphthol and the azide product is crystallized from dimethylformamide, there is obtained 2,4-diazido-6-(4-hydroxynaphthyl)-s-triazine as fine needles melting at 190° C.

Analysis.—Calculated for $C_{13}H_7N_9O$ (percent): C, 51.2; H, 2.3; N, 41.3. Found (percent): C, 50.7; H, 3.1; N, 37.1.

The product had an absorption peak at 364 m$\mu$ ($\epsilon$15,000) in chloroform.

EXAMPLE 3

A solution of 0.32 grams of the photoblowing agent, 2,4-diazido-6-(4-hydroxynaphthyl)-s-triazine, in 1.0 gram of tetrahydrofuran is added to a solution of 4.3 grams of a vinylidene chloride/acrylonitrile copolymer (Saran F220 marketed by Dow Chemical Co.) and 0.5 gram of a poly(methylmethacrylate) (Lucite 41 marketed by Du Pont) in 11.0 grams of tetrahydrofuran. The resulting mixture is stirred at about 20° C. until all the azide has dissolved. The thus-obtained solution is coated with a 0.006 inch coating knife on an unsubbed poly(ethylene terephthalate) film support on a coating block heated to 43° C. The resulting coated composition is heated in an air oven at 96° C. for 10 minutes. One portion of the coating composition is exposed through a neutral density step tablet (density increments of about 0.3) to a bank of black fluorescent lights at a distance of one inch for three minutes. The same is then developed by heating in an air oven at 96° C. for 20 seconds. Four developed steps are observed, which steps have specular densities (24° cone collection angle) of 1.91, 1.65, 1.06 and 0.10 at a background density of 0.06, corresponding to a speed of 60 (1,000 divided by exposure time, in seconds, to obtain a density of 1.0). Similar results are obtained with 0.32 grams of the diazidohydroxynaphthyl-s-triazine, 2,4-diazido-6-(2-hydroxynaphthyl) - s - triazine, as the photoblowing agent.

EXAMPLE 4

A second portion of the coated composition produced as described in Example 3 is stored for 2 months at 96° C. for 120 minutes, and then is exposed and developed as described in Example 3. Four steps are observed having densities of 1.88, 1.78, 0.84 and 0.15 at a background density of 0.07, corresponding to a speed of 53.

EXAMPLE 5

A third portion of the coated composition produced as described in Exmaple 3 is stored for 2 months at room temperature and 81 percent relative humidity. A first portion of this segment is exposed and developed as described in Example 3 and five steps are printed. After storage for an additional 12 months, a second portion of the above composition is exposed and developed and five steps being observed. After storing at room temperature and 30 percent relative humidity for a further 9 months, a third portion of the above composition is exposed and developed to obtain 5 steps with little loss in densities.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. In a vesicular composition comprising an amount of a photoblowing agent sufficient to form a vesicular image, said photoblowing agent being capable of releasing nitrogen gas on exposure to actinic radiation, said photoblowing agent being substantially uniformly dispersed in a polymeric, thermoplastic, hydrophobic matrix having sufficient impermeability to nitrogen gas to prevent undue loss of the gas before development of the image, the improvement which comprises having as the photoblowing agent an azide-s-triazine having the formula:

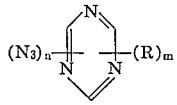

wherein R is an aromatic radical, said R and azido radicals being substituted to the nuclear carbon positions of the triazine ring; each of $m$ and $n$ is an integer having a value of from 1 to 2 and $m+n$ is equal to 3.

2. A vesicular composition as defined by claim 1, wherein the photoblowing agent is an azido-s-triazine having the formula:

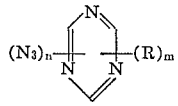

wherein R is an aryl radical selected from the group consisting of a phenyl radical and a naphthyl radical; each of $m$ and $n$ is an integer having a value of from 1 to 2 and $m+n$ is equal to 3.

3. A vesicular composition as defined by claim 1, wherein the photoblowing agent is an azido-s-triazine having the formula:

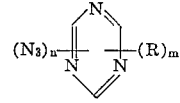

wherein R is an aryl radical containing substituents selected from the group consisting of lower alkyl, lower alkoxy, hydroxy, halogen and mercapto; each of $m$ and $n$ is an integer having a value of from 1 to 2, and $m+n$ is equal to 3.

4. A vesicular composition as defined by claim 1, wherein the photoblowing agent is a diazido hydroxynaphthyl-s-triazine.

5. A vesicular composition as defined by claim 1, wherein the photoblowing agent is 2,4-diazido-6-(4-hydroxynaphthyl)-s-triazine.

6. A vesicular composition as defined by claim 1, wherein the photoblowing agent is 2,4-diazido-6-(2-hydroxynaphthyl)-s-triazine.

7. A photographic element comprising a support having coated thereon a light-sensitive vesicular composition as defined by claim 1.

References Cited

UNITED STATES PATENTS

| | | | |
|---|---|---|---|
| 3,032,414 | 5/1962 | James et al. | 96—91 XR |
| 3,062,650 | 11/1962 | Sagura et al. | 96—91 XR |
| 3,282,693 | 11/1966 | Sagura et al. | 96—75 XR |
| 3,143,418 | 8/1964 | Priest et al. | 96—91 XR |
| 3,355,295 | 11/1967 | Priest | 96—91 |

FOREIGN PATENTS

| | | |
|---|---|---|
| 850,954 | 10/1960 | Great Britain. |
| 1,281,905 | 11/1961 | France. |

NORMAN G. TORCHIN, Primary Examiner

C. L. BOWERS, JR. Assistant Examiner

U.S. Cl. X.R.

96—49, 75, 88